United States Patent [19]
Lee

[11] Patent Number: 5,670,267
[45] Date of Patent: Sep. 23, 1997

[54] BATTERY STORAGE PACK ADAPTER FOR A PORTABLE COMPUTER

[75] Inventor: Cheon-Yeol Lee, Seoul, Rep. of Korea

[73] Assignee: Samsung Electronics Co., Ltd., Suwon, Rep. of Korea

[21] Appl. No.: 496,066

[22] Filed: Jun. 28, 1995

[30] Foreign Application Priority Data

Jun. 30, 1994 [KR] Rep. of Korea ............... 94-15559

[51] Int. Cl.⁶ ............................................... H01M 2/10
[52] U.S. Cl. .................... 429/9; 429/100; 429/99; 429/163
[58] Field of Search ...................... 429/95, 96, 97, 429/99, 100, 163, 164, 9

[56] References Cited

U.S. PATENT DOCUMENTS

| | | | |
|---|---|---|---|
| 5,208,116 | 5/1993 | Joh | 429/96 |
| 5,210,681 | 5/1993 | Hosoi et al. | 361/393 |
| 5,321,580 | 6/1994 | Hosoi et al. | 361/684 |
| 5,384,207 | 1/1995 | Ohtani | 429/99 |
| 5,422,784 | 6/1995 | Wakahara et al. | 301/680 |

*Primary Examiner*—Prince Willis, Jr.
*Assistant Examiner*—Carol Chaney
*Attorney, Agent, or Firm*—Cushman Darby & Cushman, IP Group of Pillsbury Madison & Sutro LLP

[57] ABSTRACT

An auxiliary battery storage pack is inserted in the main battery storage pack for a portable computer in place of the specially designed battery so that the user can install ordinary batteries therein. The auxiliary pack adapts the internal size of the main battery storage pack so that it can receive batteries of various size, and connects the contact springs of the computer, through the main battery pack, with corresponding electrodes of the ordinary batteries.

20 Claims, 7 Drawing Sheets

BATTERY STORAGE PACK ADAPTER FOR A PORTABLE COMPUTER

BACKGROUND OF THE INVENTION

(1) Field of Invention

The present invention relates to a battery storage pack adapter for a portable computer. Particularly, this invention relates to a battery storage pack for a portable computer, which alternatively utilizes one or more specifically designed batteries, and one or more ordinary batteries.

(2) Description of the Prior Art

Portable computers are typically supplied with electrical power through portable power supplies with limited capacities such as batteries. If the power stored in the battery is entirely consumed because of long use, a user must recharge it or replace it with a new battery. Accordingly, a main complaint of portable computer users concerns the battery.

Conventional portable computer batteries are specifically designed and manufactured by each computer company. Therefore, the battery designed for one portable computer cannot be interchanged with batteries manufactured by other companies. When the power stored in the battery of a portable computer is entirely consumed, the user recharges the battery, or purchases and substitutes a new specially designed battery. This leads to an economic burden and inconvenience for the portable computer user.

SUMMARY OF THE INVENTION

An object of the present invention is to provide a battery storage pack for a portable computer which solves the problems in the prior art. It is a further object of the present invention to allow a user to power any portable computer, irrespective of manufacturer, by providing a battery storage pack which alternatively accepts a specially designed battery and an ordinary battery In order to achieve these and other objects, the present invention provides an auxiliary battery storage pack which is inserted in a main battery storage pack in place of the specially designed battery so that the user can install ordinary batteries therein. The auxiliary pack adapts the internal size of the main battery storage pack so that it can receive batteries of various size, and connects the contact springs of the computer, through the main battery pack, with corresponding electrodes of the ordinary batteries.

DETAILED DESCRIPTION OF THE PREFERRED EMBODIMENTS

Two preferred embodiments of the subject invention will become understood from the following detailed description when viewed in light of the accompanying drawings.

Figure 1:
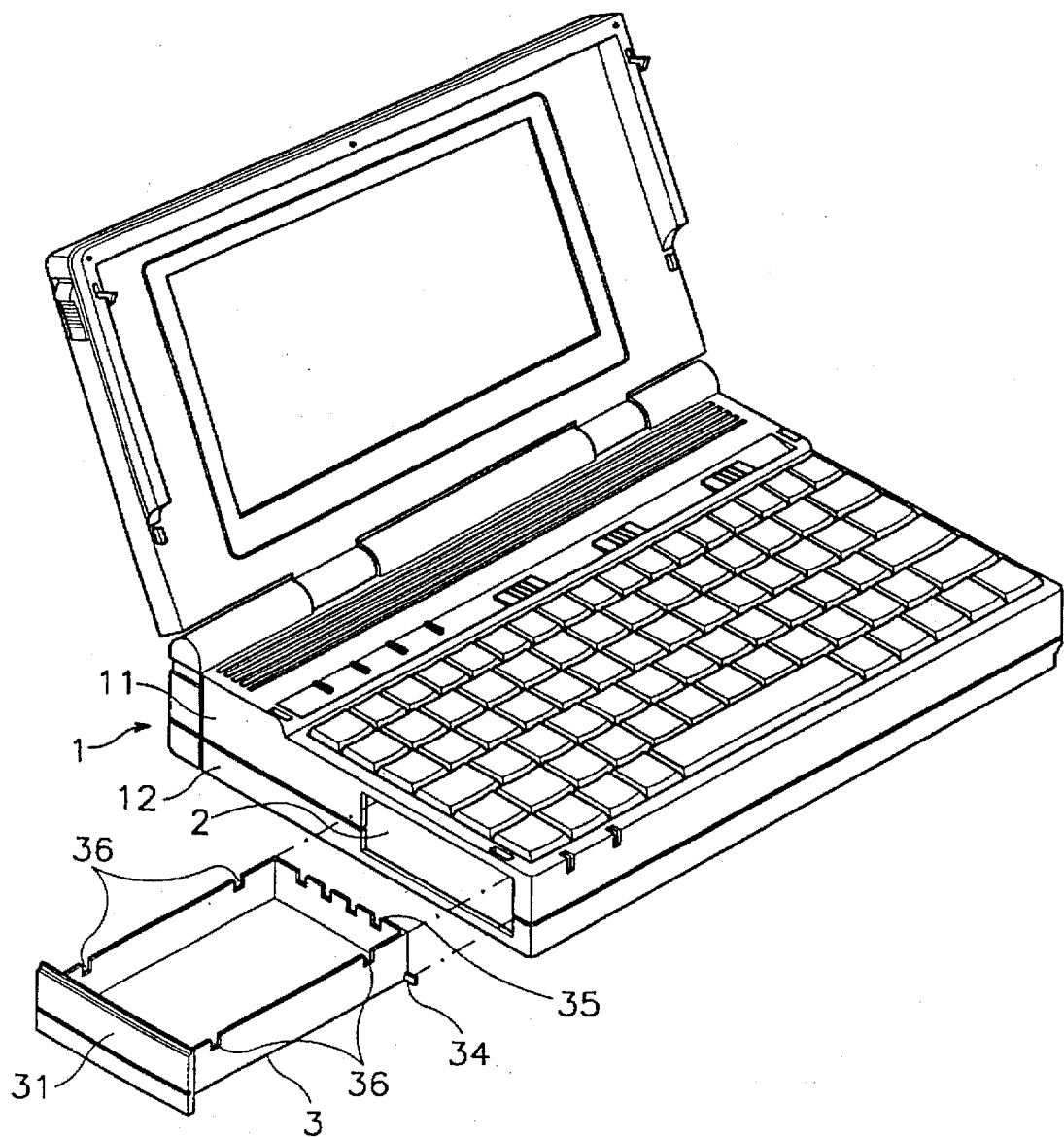
FIG. 1 is an exploded perspective view of a portable computer and a main battery storage pack in accordance with a preferred embodiment of the invention.
Figure 6:
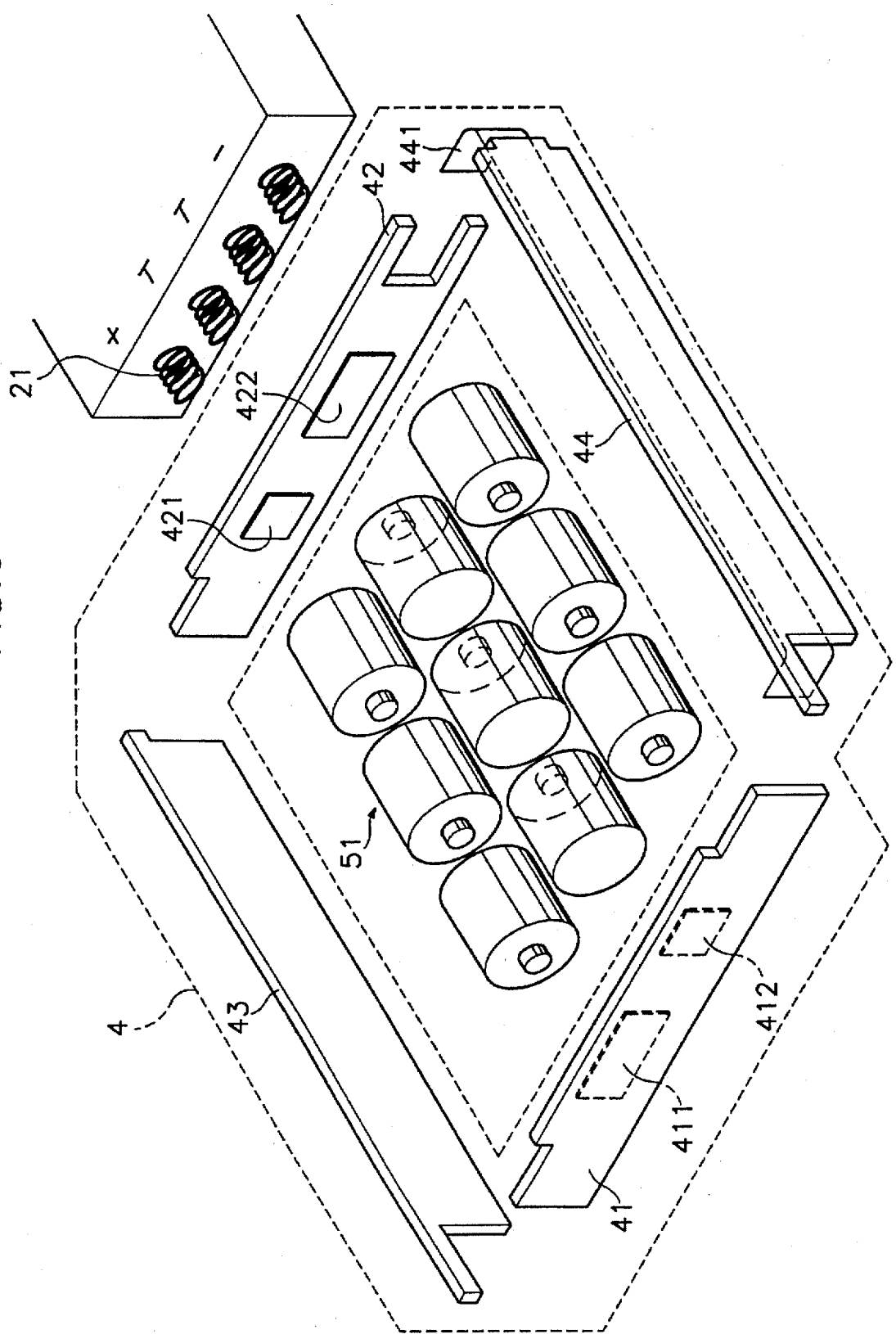
FIG. 6 is a fragmentary perspective view of an auxiliary battery storage pack, and the spring-loaded battery contact terminals of the computer, in accordance with a first preferred embodiment of the invention.

Referring to FIG. 1 and FIG. 6, the body 1 of a portable personal computer is shown provided with a compartment 2 for slidably receiving a main battery storage pack 3. The pack 3 is adapted to removably receive either one or more special batteries or an auxiliary battery storage pack 4 which makes it possible to use ordinary batteries.

The battery storage pack 3 includes a catcher 34 which prevents the pack 3 from being separated from the body 1, when the user slidingly draws the battery storage pack 3 from the body 1 to replace a used battery with a new battery. The pack 3 further includes a lock 300 which can perform a locking operation for the battery storage pack 3 upon vertical movement of the battery door 31 provided on the outer end of the pack 3.

The auxiliary battery storage pack 4 includes a door guider 41; a contact guider 42; first and second wall guiders 43, 44, contact parts 411, 412, 421, 422, 441 which function to connect corresponding electrodes (+,–) of the batteries 51 and to fix the ordinary batteries at their respective derived locations in the auxiliary battery pack.

An operation of the invention having the above described construction is described below.

First of all, the user pulls out the battery storage pack 3 inserted in the body 1, to mount the battery or batteries in the portable computer, by moving the battery door 31.

Figure 2:
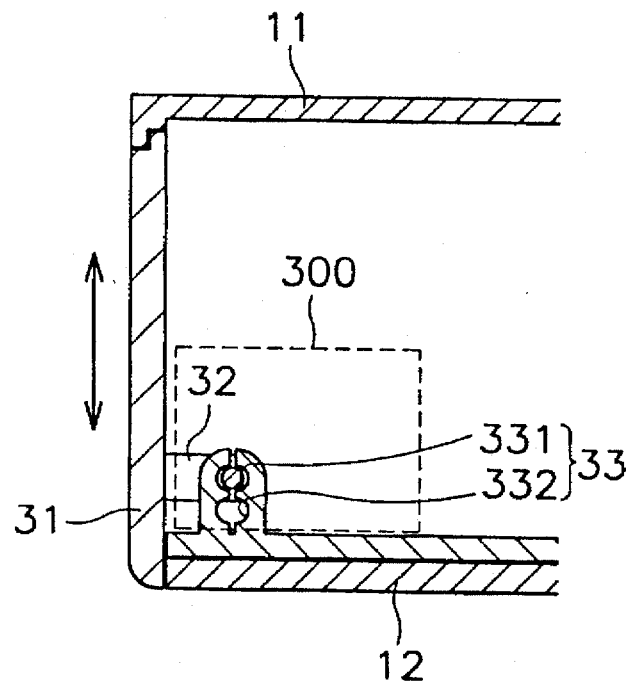
FIG. 2 is a cross-sectional view of the main battery pack in accordance with a first preferred embodiment of the invention.

As shown in FIG. 2, a lock catch 32 of the lock equipment 300 mounted on the battery door 31 varies its position according to the movement of the battery door 31, and is moved in the same direction when the battery door 31 is moved upwards. As a result, the inserted condition of a catch groove 33 of the lock equipment 300 is changed.

That is, as the lock catch is inserted into a first catch hole 331 of the catch groove 33 in the lock equipment 300, the battery door 31 gets caught at the top panel 11 of the body 1, because of the way both the top panel 11 of the body 1 and the battery door 31 are shaped. As a result, the battery door 31 cannot be opened.

When the user pulls out the battery storage pack from the body 1 to replace the mounted battery with another or to simply remove it, the user moves the battery door 31 downwards.

Accordingly, the lock catch 32 of the lock equipment 300 moves downward and is inserted into a second catch hole 332 of the catch groove 33.

Therefore, the user can pull out the battery storage pack 3 inserted into the compartment of the computer body 1, because the battery door 31 which was caught at the top panel 11 of the body 1 can now be freely moved without being caught at the top panel 11.

If the battery storage pack 3 moves into a fixed position by the movement of the battery door 31, the catcher 34 is caught at the bottom panel of the body 1 because both sides of the battery storage pack 3 have catches 34 projected as shown in FIG. 1.

Consequently, the battery storage pack 3 is formed not to be pulled out any further, and so cannot be separated from the body 1 completely. Therefore, because of the above-mentioned function, a user can be free from such problems as could result from the battery storage pack 3 being completely separated and lost, or needing to be inserted again to the compartment 2.

Figure 3:
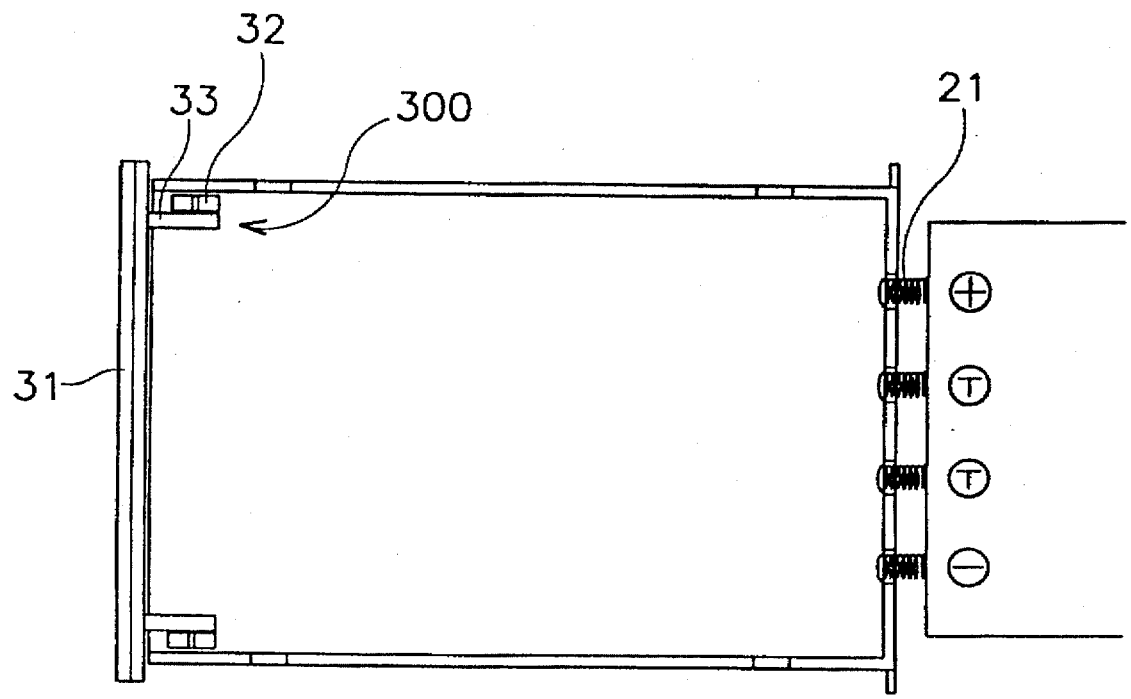
FIG. 3 is a fragmentary plan view of a main battery storage pack and the spring-loaded battery pack contact terminals of the computer, in accordance with a first preferred embodiment of the invention.

As shown in FIGS. 1 and 3, a number of grooves 35 are formed in the inner, back side of the battery storage pack 3 in order to connect electrodes (+,−) and sensing terminals (T) by contact springs 21 provided within the compartment 2 of the body 1, with the corresponding battery terminals. When the battery storage pack 3 is fully inserted into the body 1, the contact springs 21 formed within the compartment in the body 1 project through grooves 35 formed in the battery storage pack 3.

Figure 4:
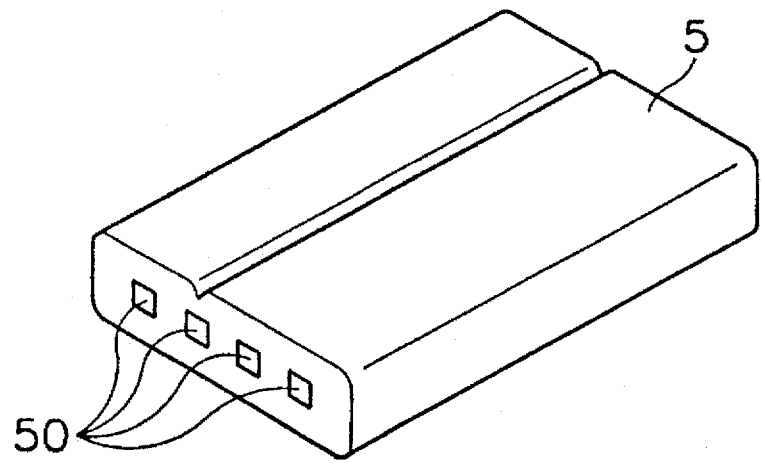
FIG. 4 is a perspective view of a special battery for use in the main battery storage pack in accordance with a first preferred embodiment of the invention.

If a battery 5 is mounted in the battery storage pack 1, contact springs 21 are compacted by the battery. As a result, contact terminals 50 shown in FIG. 4 are connected to the contact parts of the body 1, and the portable computer has a reliable power supply and performs properly.

Figure 5:
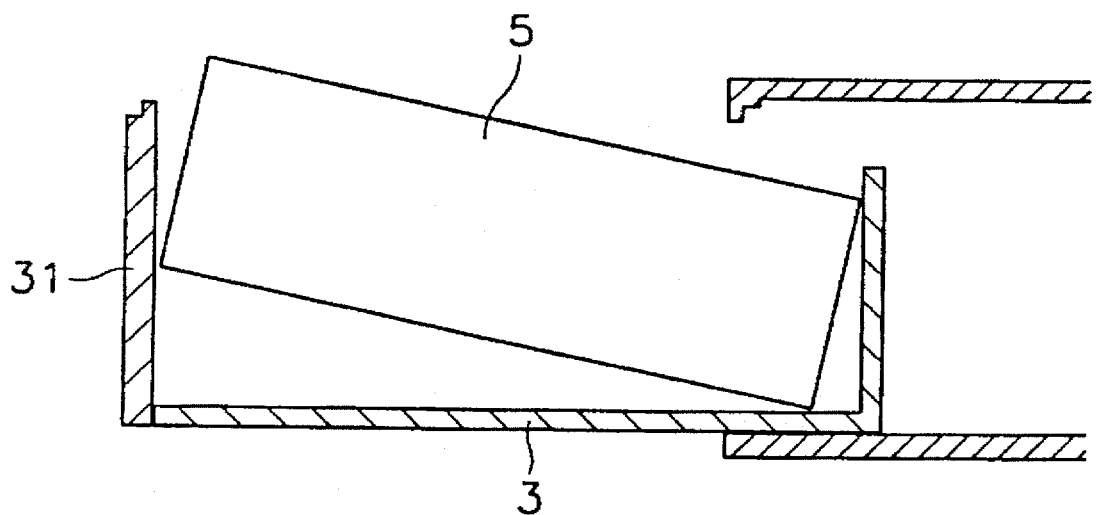
FIG. 5 is a fragmentary cross-sectional view of the main battery storage pack in which a special battery is being inserted, and received in the battery compartment of the computer, in accordance with a first preferred embodiment of the invention.

When a special battery 5 commonly used in a portable computer is received in the battery storage pack 3 as shown in FIG. 5, the contact terminals 50 of the special battery 5 are connected with the contact springs 21 provided in the body 1, and the corresponding electrodes (+,−) of the special battery 5 are electrically connected to power supply circuits of the computer (not shown).

Next described is the battery storage pack 3, formed as above, alternatively using the ordinary batteries 51 instead of the special battery 5.

Because the battery storage pack 3 is designed to take into consideration the given size of a special battery commonly used in a portable computer, if one or more ordinary batteries 51 are used, the space of the battery storage pack 3 is not fully occupied.

To take up the remaining space within the battery storage pack 3 after one or more ordinary batteries 51 are loaded in it, as shown in FIG. 6, the auxiliary battery storage pack 4 has several extended rigid elements including contact guider 42, a door guider 41, and first and second wall guiders 43,44, which occupy the remaining space.

Further, to connect the contact springs 21 provided inside the compartment 2 of the computer body 1 with the corresponding electrodes (+,−) of the one or more ordinary batteries 51, and to connect the corresponding electrodes (+,−) of the respective batteries 51 to one another, the auxiliary battery storage pack 4, is provided with metal plates which transfer the power supply.

To connect the positive electrode of the set of contact springs 21, with the positive electrodes of the set of ordinary batteries 51, as shown in FIG. 6, a first contact part 421 is formed on both sides of the contact guider 42. Also provided are a first contact part 411 and a second contact part 422 in the contact guider 42 and the door guider 41, for connecting respective electrodes (+,−) of the ordinary batteries 51. Therefore, the ordinary batteries 51 can connect their electrodes with one another.

To connect the negative electrode of the ordinary batteries 51 with the negative contact part of the set of contact springs 21, the negative electrodes of the ordinary batteries 51 are connected with the second contact part 412 of the door guider 41, while the contact part 441 formed in the second wall guider 44 is connected with the second contact part 412 of the door guider 41.

Figure 7:
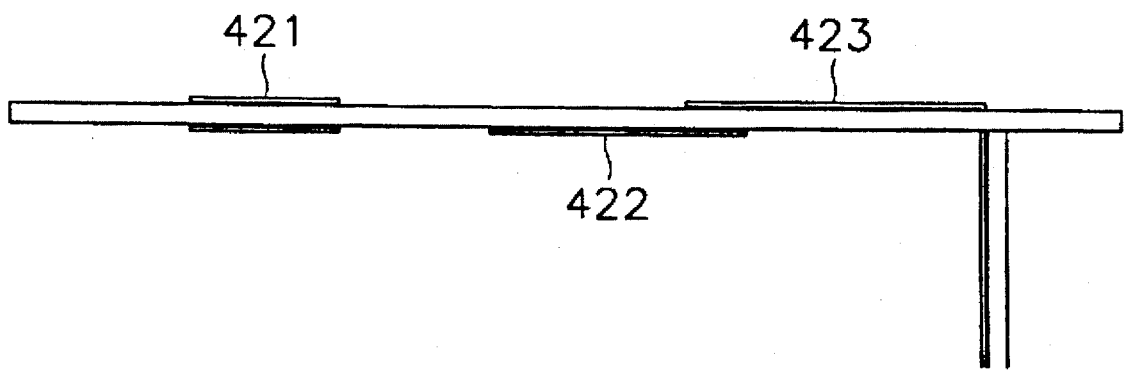
FIG. 7 is a plan view of a contact guider in accordance with a first preferred embodiment of the invention.

As further shown in FIG. 7, the corresponding electrodes of the ordinary batteries 51 are connected with corresponding sets of contact springs 21, because the contact part of the second wall guider 44 is connected with the third contact part 423 formed outside of the contact guider 42. Therefore, the user can use ordinary batteries 51.

For contacting the door guider 41 and the corresponding contact parts 421, 422 of the contact guider 42 appropriately, the contact part 441 formed in the second wall guider 44 is extended so as to provide a spring function in both sides of the contact part. After the door guider 41, contact guider 42, and first and second wall guiders 43,44 are each placed in their respective positions, a set including one or more ordinary batteries 51 can be stored in the battery storage pack 3. How these are assembled is shown in FIG. 6. Thereafter, the user can insert the battery storage pack into the compartment 2 of the computer body 1 through the battery door 31.

As shown in FIG. 1, grooves 36 are formed of the battery storage pack 3 to connect the door guider 41 with the contact guider 42 shown in FIG. 6. By adjusting the positions of the door guider 41 and the contact guider 42, the user can fix the arrangement of the ordinary batteries 51 mounted in the battery storage pack 3.

Figure 8:
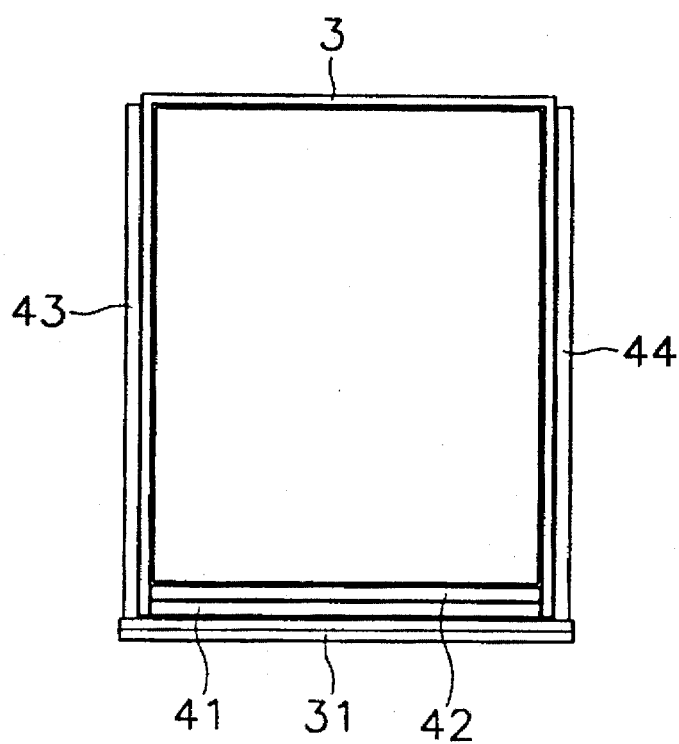
FIG. 8 is a plan view of the main battery pack, receiving in a stowed, non-use condition the parts of the auxiliary battery storage pack, in which ordinary batteries can be packed in accordance with a first preferred embodiment of the invention.
Figure 9:
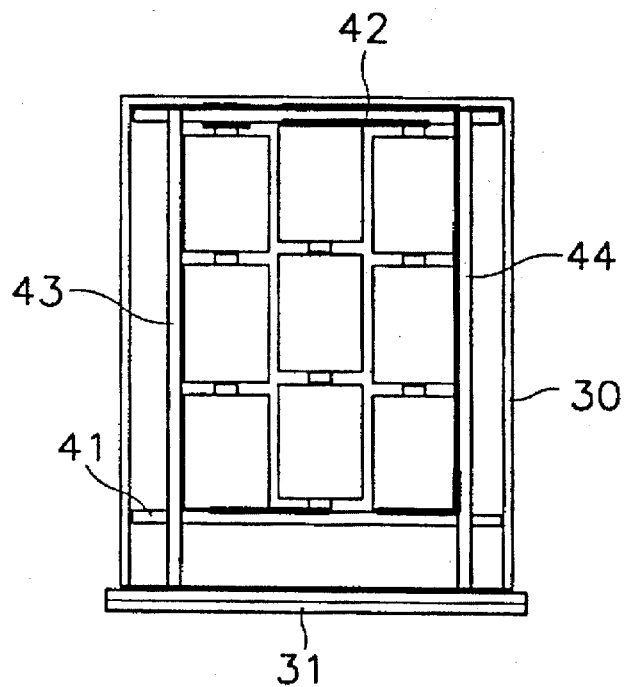
FIG. 9 is an assembled view of an auxiliary battery storage pack containing ordinary batteries in accordance with a first preferred embodiment of the invention.

However, when the user uses a special battery 5 instead of one or more ordinary batteries 51, the unused guiders 41, 42, 43, 44 are stowed in a non-use condition in remaining space of the battery storage pack 3 as shown in FIG. 8. Consequently, the battery storage pack 3 is formed to leave a space between the battery storage pack 3 and the battery door 31, in which the door guider 41 and the contact guider 42 are stowed.

Also, to stow the first and second wall guiders 43, 44 into the battery storage pack 3, the compartment 2 is designed to include a space between the battery storage pack 3 and the compartment 2. As shown in FIG. 8, because the battery storage pack 3 includes the unused door guider 41, contact guider 42, and first and second wall guiders 43, 44, the user can manage the battery storage pack 3 easily without any danger the unused guiders being lost.

As described above, the user can use either a special battery 5 commonly used in a portable computer or an ordinary battery 51, by means of using guiders 41, 42, 43, 44 forming the auxiliary battery storage pack. This solves problems of inconvenience in using a portable computer and facilitates a simple management of the battery storage pack.

Figure 10:
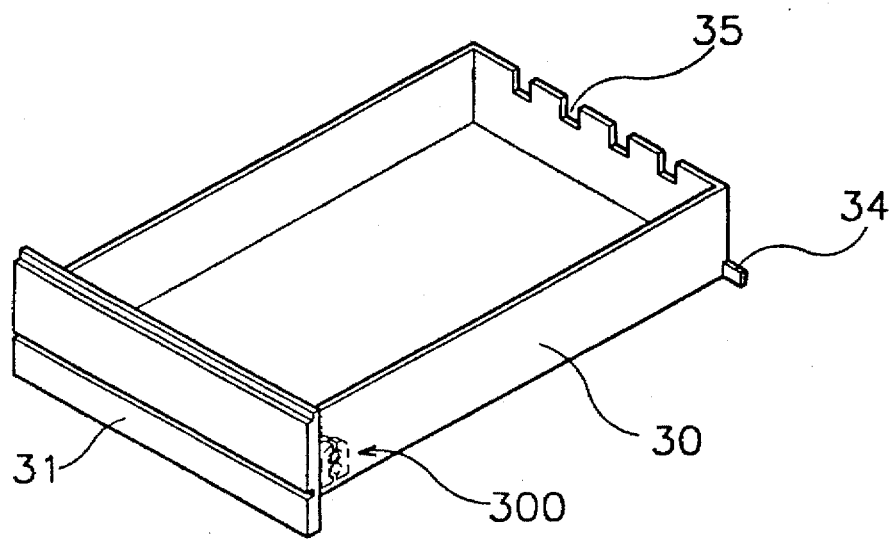
FIG. 10 is a perspective view of a battery storage pack for a portable computer in accordance with a second preferred embodiment of the invention.
Figure 11:
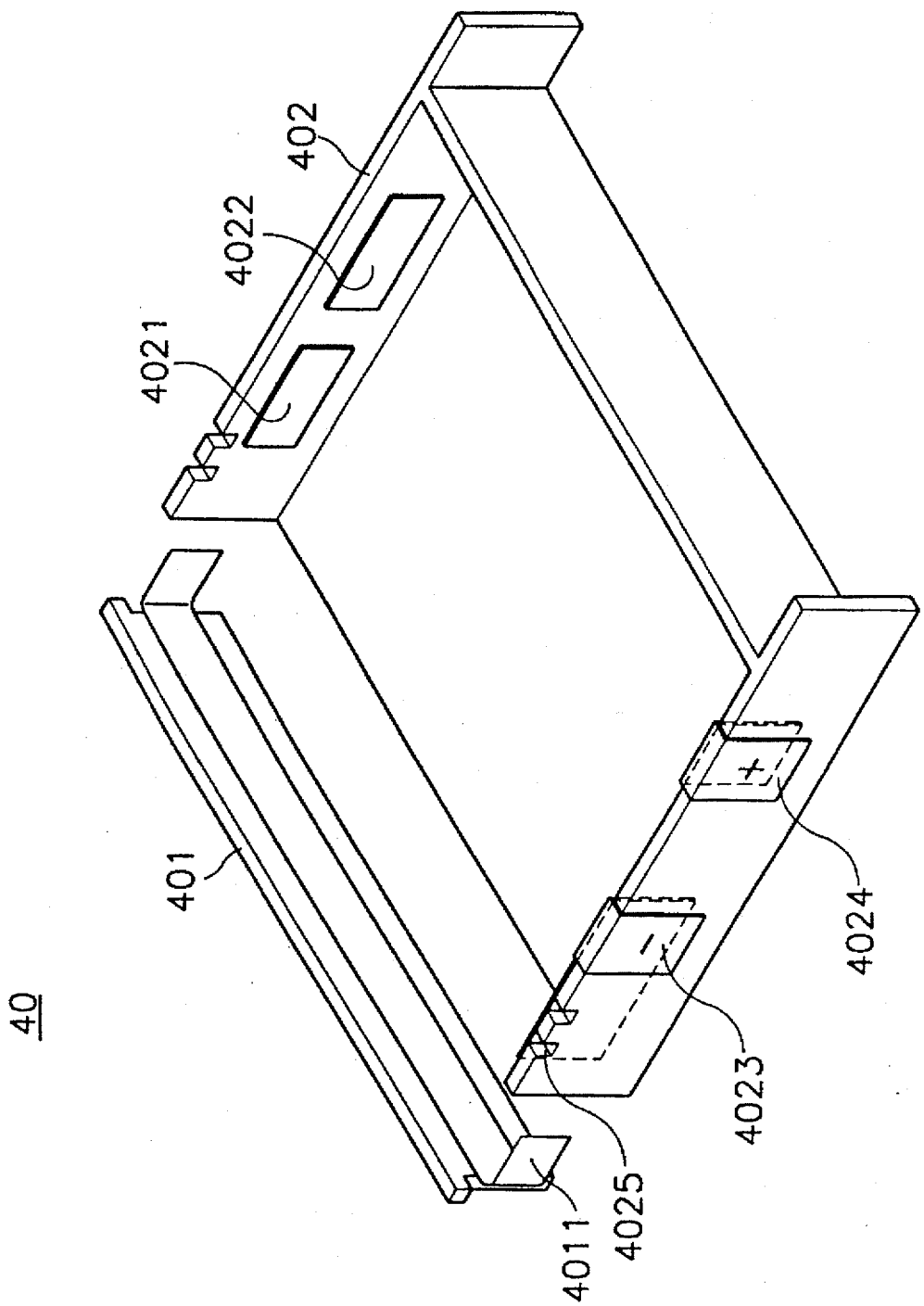
FIG. 11 is an exploded perspective view of an auxiliary battery storage pack in accordance with a second preferred embodiment of the invention.

In FIGS. 10 and 11, another preferred embodiment of the invention for using ordinary batteries is shown.

The second preferred embodiment includes:

a battery storage pack 30 which may store either a special battery 5 commonly used in a portable computer or one or more ordinary batteries 51; and an auxiliary battery storage pack 40 which is mounted inside the battery storage pack 30.

The auxiliary battery storage pack 40 includes:

a first guider 401 which appropriately receives a special battery 5, has a lead spring 4011 which connects the corresponding terminal of a contact spring 21 with an electrode of a special battery 5; and a second guider 402 having a square form, which stands inside of the battery storage pack 30 to receive the ordinary battery or set of ordinary batteries 51, connects the electrode (+,−) of the ordinary batteries 51 with one another, mounts the first guider 401 on itself, and connects the corresponding terminal of a contact spring 21 with the corresponding electrode(+,−) of the ordinary batteries 51.

The battery storage pack 30, similar to the battery storage pack 3 of the first preferred embodiment of the invention, has lock equipment 300 in its sides to prevent the pack from being pulled out completely from the compartment 2 and to permit the pack to be inserted back into the body 1.

Therefore, if the user uses a special battery 5 commonly used in a portable computer, the battery 5 should be loaded in the battery storage pack 30 first and then the pack should be inserted into the compartment 2.

Also, the battery door 31 should be completely inserted into the compartment 2 by moving it toward its locking direction, so that corresponding terminals of contact springs 21 are connected with the corresponding electrodes of special battery 5. Therefore, a problem of bad electrical contact can be prevented.

When an ordinary battery 51 is loaded in the battery storage pack 30, the user mounts the auxiliary battery storage pack 40 inside the battery storage pack 30, packs the ordinary battery or set of batteries 51 inside the auxiliary battery storage pack 40 as needed, and places the first guider 401 into the catch groove 4025 formed at the second guider 402.

Consequently, the corresponding terminals of contact springs 21 are connected with the corresponding negative electrodes of ordinary batteries 51 by means of the leaf spring 4011 mounted on the first guider 401, and the ordinary batteries 51 can be used as the power supply for the portable computer.

The second guider 402 has a number of catch grooves 4025, which make possible to use various sizes of ordinary batteries 51 by adjusting the space in the battery storage pack according to the aggregate size of the battery or batteries used. The auxiliary battery storage pack 40 includes contact parts 4021–4022 on the second guider 402 to connect electrodes of the ordinary battery or batteries 51 with one another, and leaf spring 4011 on the first guider 401 and contact parts 4023–4023 on second guider 402 to connect the corresponding terminal of the contact springs 21 with the corresponding negative electrode of the ordinary battery or batteries 51.

Because the user can use a special battery commonly used in a portable computer as well as ordinary batteries by using the auxiliary battery storage pack 40, the user does not have to always use a specially designed battery.

As described above, the battery storage pack adapter of the present invention can enable a user to power any portable computer with either a specially designed battery manufactured for the portable computer, or ordinary batteries.

What is claimed is:

1. A battery storage pack for a battery-operated portable computer having a battery compartment including resilient contacts, said battery storage pack comprising:

a main battery storage pack disposed in said battery compartment which removably stores a first battery in an interior thereof, said main battery storage pack having a plurality of grooves through which each of said resilient contacts connect with respective terminals of said first battery and a battery door by which a user accesses said interior of said main battery storage pack;

an auxiliary battery unit capable of being removably stored in said interior of said main battery storage pack in place of said first battery, said auxiliary battery unit including:

at least one second battery having a smaller size than said first battery, and an adapter which compensates for said smaller size of said second batteries in said interior of said main battery storage pack, and by which each of said resilient contacts operably connect with corresponding terminals of said second batteries; and at least one catch disposed on an exterior portion of said main battery storage pack which prevents said main battery storage pack from being completely removed from said compartment of said portable computer.

2. The battery storage pack of claim 1, wherein said adapter includes a plurality of rigid elongated elements which define:

a first wall guider, which abuts one side of said main battery storage pack;

a second wall guider, which abuts a side opposite said one side of said main battery storage pack, and has a first contact part which conducts current for operably connecting said corresponding terminals of said second batteries with said resilient contacts;

a contact guider, which abuts a side of said main battery storage pack adjacent to said resilient contacts and which includes:

a second contact part which operably connects said corresponding terminals of said second batteries with said resilient contacts, a third contact part which connects respective terminals of said second batteries with one another, and a fourth contact part operably connected with said first contact part of said second wall guider; and a door guider which abuts a side of said main battery storage pack adjacent to said battery door and which has a fifth contact part which connects said respective terminals of said second batteries with one another.

3. The battery storage pack of claim 2, wherein:

said interior of said main battery storage pack includes space to stow said plurality of rigid elongated elements in out-of-use positions when said second batteries are not installed in place of said first battery.

4. The battery storage pack claim 2, further comprising:

a plurality of second grooves formed in said main battery storage pack by which said door guider and said contact guider are positioned to accommodate said second batteries.

5. The battery storage pack adapter of claim 1, further comprising:

lock equipment which locks said battery door in a closed position, in accordance with a predetermined movement of said battery door.

6. The battery storage pack of claim 1, wherein said adapter includes a plurality of rigid elongated elements which define:

a first guider, which abuts one side of said main battery storage pack, and which has a first contact part which conducts current for operably connecting first corresponding terminals of said second batteries with a first one of said resilient contacts;

a second guider, which abuts three remaining sides of said main battery storage pack and which includes:
  a second contact part which operably connects second corresponding terminals of said second batteries with a second one of said resilient contacts,
  third and fourth contact parts which connect respective terminals of said second batteries with one another, and
  a fifth contact part operably connected with said first contact part of said first guider which operably connects said first corresponding terminals of said second batteries with said first one of said resilient contacts.

7. A battery pack for a battery operated portable computer, comprising:
  a drawer adapted to be received in a compartment of said portable computer, said drawer having walls, including a front, a rear and two opposite sides, a plurality of battery terminal contact access openings being formed in at least one of said walls, said sides collectively defining a space, bordered by said walls, which is sized and shaped to receive a first battery and to dispose respective terminals of said first battery at each of said access openings; and
  an adapter removably disposable in said space which compensates for the size and shape of said space for receiving at least one second battery for powering said computer in place of said first battery, and includes contact portions which operably dispose respective terminals of said second batteries at each of said access openings.

8. The battery storage pack of claim 7, wherein said drawer includes a battery door by which a user accesses said space of said drawer.

9. The battery storage pack of claim 8, further comprising:
  lock equipment which locks said battery door in a closed position, in accordance with a predetermined movement of said battery door.

10. The battery storage pack of claim 7, wherein said adapter includes a plurality of rigid elongated elements which define:
  a first wall guider, which abuts one of said two opposite sides of said drawer;
  a second wall guider, which abuts a second one of said two opposite sides of said drawer, and has a first contact part which conducts current for operably connecting first corresponding terminals of said second batteries;
  a contact guider, which abuts said rear side of said drawer, said plurality of battery contact access openings being formed in a wall corresponding to said rear side, said contact guider including:
    a second contact part which operably connects second corresponding terminals of said second batteries,
    a third contact part which connects respective terminals of said second batteries with one another, and
    a fourth contact part operably connected with said first contact part of said second wall guider; and
  a door guider which abuts said front side of said drawer and which has a fifth contact part which connects said respective terminals of said second batteries with one another.

11. The battery storage pack of claim 10, wherein:
said space of said drawer includes portions to stow said first and second wall guiders, said contact guider and said door guider in out-of-use positions when said second batteries are not installed in place of said first battery.

12. The battery storage pack of claim 10, further comprising:
  a plurality of grooves formed in said drawer by which said door guider and said contact guider are positioned to accommodate said second batteries.

13. The battery storage pack of claim 7, wherein said adapter includes a plurality of rigid elongated elements which define:
  a first guider, which abuts one of said two opposite sides of said drawer, and which has a first contact part which conducts current for operably connecting first corresponding terminals of said second batteries;
  a second guider, which abuts three remaining sides of said drawer and which includes:
    a second contact part which operably connects second corresponding terminals of said second batteries,
    third and fourth contact parts which connect respective terminals of said second batteries with one another, and
    a fifth contact part operably connected with said first contact part of said first guider which operably connects said first corresponding terminals of said second batteries.

14. The battery storage pack of claim 13, further comprising:
  a plurality of grooves formed in said second guider by which said first guider is positioned to accommodate said second batteries.

15. The battery storage pack of claim 7, wherein said drawer further includes:
  at least one catch disposed on an exterior portion of said drawer which prevents said drawer pack from being completely removed from said compartment of said portable computer.

16. A battery storage pack for a battery-operated portable computer having a battery compartment including resilient contacts, said battery storage pack comprising:
  a main battery storage pack disposed in said battery compartment which removably stores a first battery in an interior thereof, said main battery storage pack having a plurality of grooves through which each of said resilient contacts connect with respective terminals of said first battery and a battery door by which a user accesses said interior of said main battery storage pack; and
  an auxiliary battery unit capable of being removably stored in said interior of said main battery storage pack in place of said first battery, said auxiliary battery unit including at least one second battery having a smaller size than said first battery, and an adapter which compensates for said smaller size of said second batteries in said interior of said main battery storage pack, and by which each of said resilient contacts operably connect with corresponding terminals of said second batteries, said adapter having a plurality of rigid elongated elements which define:
    a first wall guider, which abuts one side of said main battery storage pack,
    a second wall guider, which abuts a side opposite said one side of said main battery storage pack, and has a first contact part which conducts current for operably connecting said corresponding terminals of said second batteries with said resilient contacts, a contact guider, which abuts a side of said main battery storage pack adjacent to said resilient contacts and which includes:
- a second contact part which operably connects said corresponding terminals of said second batteries with said resilient contacts,
- a third contact part which connects respective terminals of said second batteries with one another, and
- a fourth contact part operably connected with said first contact part of said second wall guider, and a door guider which abuts a side of said main battery storage pack adjacent to said battery door and which has a fifth contact part which connects said respective terminals of said second batteries with one another.

17. The battery storage pack of claim 16, wherein said main battery storage pack further includes:

at least one catch disposed on an exterior portion of said main battery storage pack which prevents said main battery storage pack from being completely removed from said compartment of said portable computer.

18. The battery storage pack of claim 16, wherein:

said interior of said main battery storage pack includes space to stow said plurality of guiders in out-of-use positions when said second batteries are not installed in place of said first battery.

19. The battery storage pack of claim 16, further comprising:

a plurality of second grooves formed in said main battery storage pack by which said door guider and said contact guider are positioned to accommodate said second batteries.

20. The battery storage pack of claim 16 wherein said plurality of rigid elongated elements are substantially flat.

* * * * *